(12) United States Patent  
Fletcher et al.

(10) Patent No.: US 9,002,509 B2  
(45) Date of Patent: Apr. 7, 2015

(54) SYSTEM FOR WRITING AND DISPENSING SOLID-STATE STORAGE DEVICES

(75) Inventors: Gordon P. Fletcher, La Mesa, CA (US); Lisbeth M. Fletcher, La Mesa, CA (US)

(73) Assignee: Digital Storage Solutions, Inc., La Mesa, CA (US)

( * ) Notice: Subject to any disclaimer, the term of this patent is extended or adjusted under 35 U.S.C. 154(b) by 232 days.

(21) Appl. No.: 13/338,546

(22) Filed: Dec. 28, 2011

(65) Prior Publication Data

US 2013/0001240 A1     Jan. 3, 2013

Related U.S. Application Data

(63) Continuation-in-part of application No. 12/980,128, filed on Dec. 28, 2010, now abandoned, and a continuation-in-part of application No. 13/111,142, filed on May 19, 2011, now abandoned.

(51) Int. Cl.
    *G06K 13/103*     (2006.01)
    *G06K 17/00*     (2006.01)

(52) U.S. Cl.
    CPC ...... *G06K 13/103* (2013.01); *G06K 2017/0041* (2013.01)

(58) Field of Classification Search
    USPC .............. 700/233, 234, 235, 240; 361/679.31
    See application file for complete search history.

(56) References Cited

U.S. PATENT DOCUMENTS

| | | | |
|---|---|---|---|
| 5,535,399 A | 7/1996 | Blitz et al. | |
| 6,957,746 B2 * | 10/2005 | Martin et al. | 221/131 |
| 7,128,261 B1 * | 10/2006 | Henderson et al. | 235/383 |
| 7,627,791 B2 | 12/2009 | Winter et al. | |
| 8,255,080 B2 * | 8/2012 | Hirsh et al. | 700/242 |
| 2006/0212531 A1 | 9/2006 | Kikkawa et al. | |
| 2006/0259188 A1 | 11/2006 | Berg | |
| 2007/0189718 A1 | 8/2007 | Kobayashi et al. | |
| 2007/0271414 A1 | 11/2007 | Nakatani et al. | |
| 2008/0124048 A1 | 5/2008 | Ko et al. | |
| 2008/0178242 A1 | 7/2008 | Eyal et al. | |
| 2009/0024671 A1 | 1/2009 | Johnson et al. | |
| 2009/0190249 A1 | 7/2009 | Rajakarunanayake | |
| 2010/0082919 A1 | 4/2010 | Chen et al. | |
| 2010/0088463 A1 | 4/2010 | Im et al. | |
| 2010/0115574 A1 | 5/2010 | Hardt et al. | |
| 2010/0129057 A1 | 5/2010 | Kulkarni | |
| 2010/0146226 A1 | 6/2010 | Zarnke et al. | |
| 2010/0146539 A1 | 6/2010 | Hicks, III et al. | |
| 2010/0217410 A1 | 8/2010 | Pan | |
| 2010/0268866 A1 | 10/2010 | Colligan | |
| 2011/0182020 A1 * | 7/2011 | Sato | 361/679.31 |

* cited by examiner

*Primary Examiner* — Timothy Waggoner
(74) *Attorney, Agent, or Firm* — Timothy W. Fitzwilliam

(57) ABSTRACT

An apparatus for writing data to and dispensing one or more of solid-state devices is enclosed. A preferred device herein comprises a write port engageable with a solid-state storage device within a chamber via a hopper. The chamber is further provided for holding the solid-state storage device as the solid-state storage device engages with the write port. Additionally a transfer assembly is provided for moving the solid-state storage device from the chamber to dispense the solid-state storage device.

13 Claims, 6 Drawing Sheets

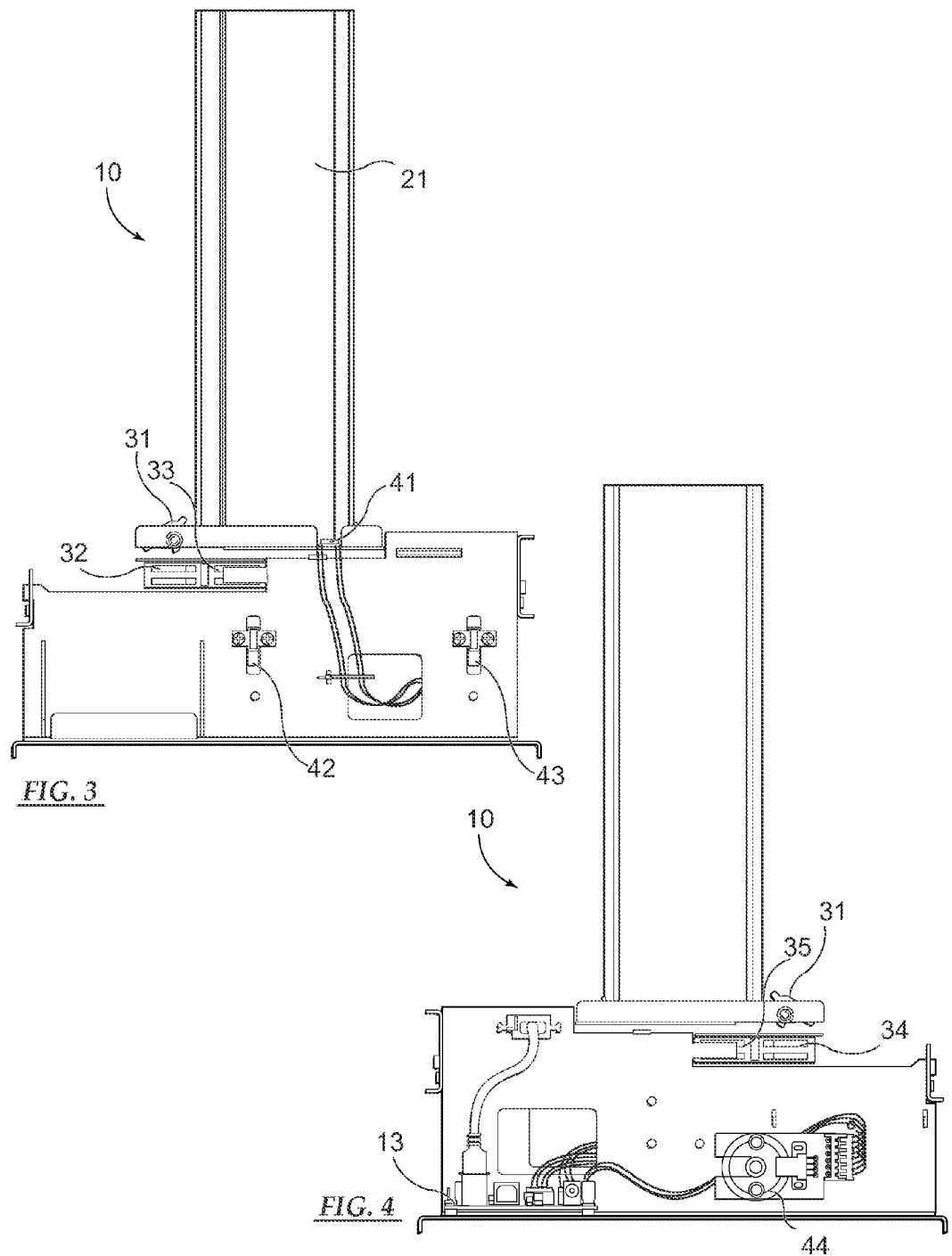

SYSTEM FOR WRITING AND DISPENSING SOLID-STATE STORAGE DEVICES

PRIORITY CLAIM

This patent application is a continuation-in-part and claims benefit of the priority date of U.S. patent application Ser. No. 12/980,128 filed on Dec. 28, 2010, now abandoned entitled SYSTEM FOR WRITING TO AND DISPENSING SOLID-STATE STORAGE DEVICES; additionally this patent application further is a continuation-in-part and claims benefit of the priority date of U.S. patent application Ser. No. 13/111,142 filed on May 19, 2011, now abandoned entitled USB SOLID STATE STORAGE DRIVE FOR AUTOMATED WRITING AND DISPENSING, accordingly, the entire contents of these patent applications are hereby expressly incorporated by reference.

BACKGROUND OF THE INVENTION

1. Field of the Invention

The present invention pertains generally to providing digital media content. More particularly, the present invention relates to providing solid-state storage devices containing digital data to a user. In a preferred embodiment, the present invention more particularly relates to apparatus and methods for writing to and dispensing solid-state storage devices.

2. Description of the Prior Art

Currently, a growing number of consumers are turning to solid-state storage devices such as thumb drives and memory cards for their computer storage needs in lieu of optical storage devices, such as CD-ROMs and DVDs, due to the increased durability, reliability, portability, and ease of storing and retrieving digital media.

Furthermore, solid-state storage devices may also allow content providers to deliver more timely and relevant content with more flexibility and lower cost as compared to traditional optical storage devices. As such, content providers such as photo labs, digital photographers, software firms, electronic game developers, or movie studios may wish to start providing content on solid-state storage devices instead of or in addition to the optical formats they currently provide.

A lack of physical, electro-mechanical, and mechanical features on currently designed universal serial bus (USB) solid state devices make loading and dispensing unreliable being prone to mistakes just as misalignment and jamming. Current USB memory device housings are primarily for cosmetic purposes, such as for marketing or branding and are not designed for handling by an automated machine such as a dispenser or a kiosk. In other words, the current devices would be often loaded incorrectly and not easily moved throughout an automated dispenser.

As can be seen, there is a need for a system for writing and dispensing solid-state storage devices. Therefore, it is an object of the present invention to provide a dispenser and writing port device that can dispense solid state memory efficiently while providing resistance to jamming, either during loading or during writing and transfer.

BRIEF SUMMARY OF THE INVENTION

The present invention specifically addresses and alleviates the above mentioned deficiencies associated with the prior art. More particularly, the present invention in a first aspect, is an apparatus for writing data to and dispensing solid-state (e.g. USB) devices, comprising: a first solid state storage device; a write port engageable to an interior of the first solid-state storage device to write the electronic data to the solid-state device; a chamber for holding the first solid-state storage device as the solid-state storage device engages with the write port; and a transfer assembly for moving the solid-state storage device from the chamber to dispense the solid-state storage device.

The apparatus for writing data to and dispensing solid-state devices is additionally characterized as comprising multiple solid state storage devices and a hopper configured above the chamber in the same footprint for containing the multiple storage devices. A preferred embodiment provides that the hopper has asymmetrical sides in a top aspect.

The apparatus for writing data to and dispensing solid-state devices of the present invention further comprises a retrieval bin for dispensing the solid-state storage devices, wherein the transfer assembly is operable to move the solid-state storage devices from the chamber to the retrieval bin. Additionally, the apparatus includes a motor and for driving movement of the transfer assembly, however other means for moving a device about in the apparatus are further contemplated herein. Reduction gears for converting rotational movement to translational movement coupled to the motor and engaging a track at an underside of the transfer assembly. As an alternative, the write port is provided moveable to engage with the solid-state storage device.

The apparatus for writing data to and dispensing solid-state devices herein is additionally characterized as having a PCB coupled to the write port, the PCB further providing command and control functions to the apparatus; and a first mechanical check valve fixed with respect to a base of the apparatus; and a plurality of second and subsequent mechanical check valves coupled to the transfer assembly and not fixed with respect to the base, wherein the second and subsequent mechanical check valves assist in grasping the first solid state storage device, and wherein the first fixed mechanical check valve allows movement of the first solid state storage device in one direction while preventing movement in an opposite direction, thereby allowing the second and subsequent mechanical check valves to release the first solid state storage device to the retrieval bin as the transfer assembly moves back and forth.

The invention in this aspect is additionally characterized as comprising a rail fixed to a base portion positioned lengthwise with respect to the transfer assembly and the chamber, wherein the transfer assembly is configured to slide along the rail while dispensing the first solid state storage device. Further, the apparatus herein includes a first sensor detecting movement of the transfer assembly in a first direction; a second sensor detecting movement of the transfer assembly in a second direction, the second direction opposite from the first direction; and a third sensor for detecting a number of solid state devices that remain in the hopper.

The present invention is still further characterized as a method for writing data to and dispensing solid-state devices, comprising: providing one or more solid state devices; holding a solid-state storage device within the one or more solid-state devices in a chamber; engaging a write port with the solid-state storage device; writing the data by the write port to the solid-state device; and moving, by a transfer assembly, the solid-state storage device from the chamber to a retrieval bin.

The invention in this aspect is additionally characterized as comprising the steps of containing the one or more solid-state devices within a hopper, the hopper configured above the chamber; transferring the solid-state storage device from the hopper to the chamber; and moving the solid-state storage device to engage the write port.

These, as well as other advantages of the present invention will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is front view of the first preferred embodiment with a housing removed;

FIG. 4 is a rear view thereof;

DETAILED DESCRIPTION OF THE PREFERRED EMBODIMENTS

Figures 1, 2:
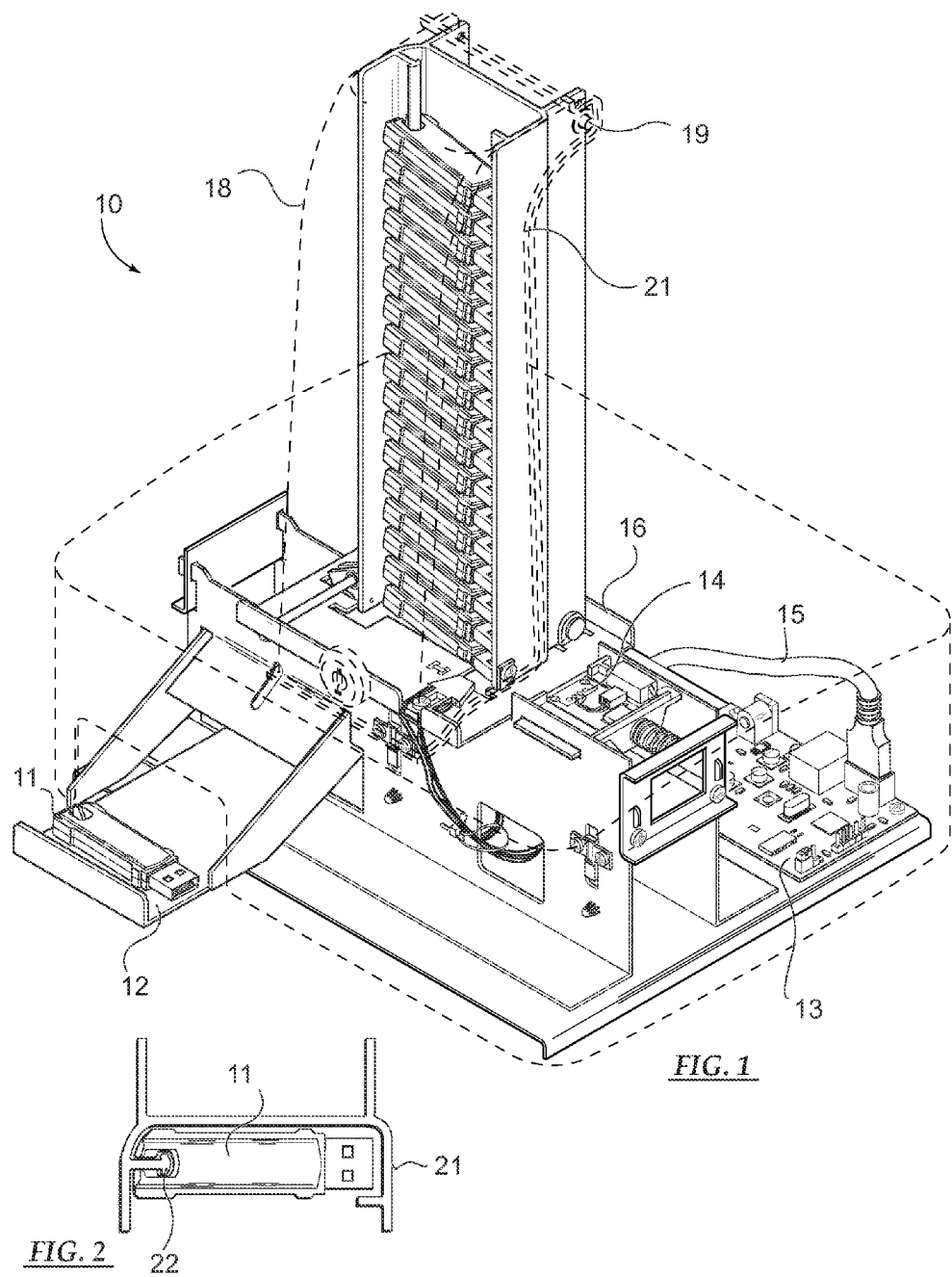
FIG. 1 is a perspective illustration of a first preferred solid state writer and dispenser of the present invention.
FIG. 2 is a top plan view of only a hopper portion of the first preferred embodiment.
Figure 5:
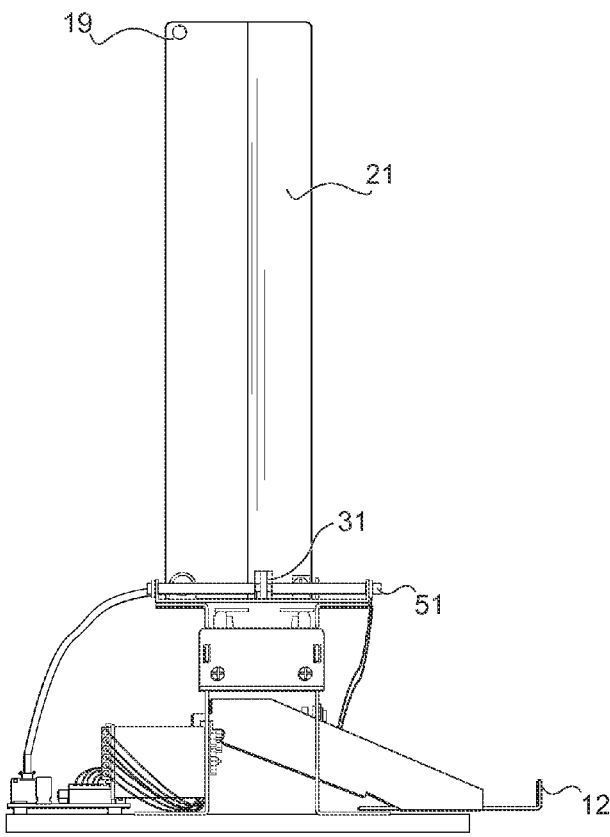
FIG. 5 is a profile view thereof.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. Broadly, embodiments of the present invention generally provide a system for writing and dispensing solid-state storage devices. Initially, with regard to FIG. 1, a first preferred system 10 for writing and dispensing solid-state storage devices 11 is illustrated with a housing 18 in dashed lines to emphasize the importance of internal components 14, 16, 21. The general concept herein is that a digital storage device 11 can be loaded to the system 10 via a hopper 21 wherein the device 11 is optionally written to (or possibly written from) via a write port 14; and further the device 11 is moved and dispensed to a retrieval bin 12 by the automated system 10. Many alternative means could be used to accomplish this concept as further discussed herein and storage devices 11 can be in numerous different sizes and shapes which may affect certain components included within the scope of the invention.

Also with regard to FIG. 1, the system 10 in a first preferred embodiment, includes a hopper 21 coupled to a base 16 for holding a plurality of solid-state storage devices 11. Housing 18 has an upper portion covering the hopper with key access that opens about hinge 19. The plurality of solid-state storage devices 11 may comprise Universal Serial Bus (USB) storage devices, memory sticks, secure digital (SD) memory cards, extreme digital (xD) memory cards, micro SD memory cards, or any other suitable solid-state storage devices 11. However herein in this example, the plurality of solid-state storage devices 11 are transferred from the hopper 21 into the base 16 in a predictable or regular manner for writing each of the plurality of solid-state storage devices 11. As shown in FIG. 1, the hopper 21 may be situated above the base 16, but in alternative embodiments the hopper 21 may be situated below or beside the base 16. A top portion of the write port 14 is illustrated in FIG. 1, however it is essentially a female type port 14 configured to mate with a male connector on the device 11, wherein data is written to the device 11 via printed circuit board (PCB) 13 and cable 15. Obviously, the cable 15 could easily be omitted if electronics 13 are successfully configured to the area of the write port 14. After writing, the solid-state storage devices 11 are moved by a transfer assembly 72 (FIG. 7) within the base 16 to a retrieval bin 12 for dispensing the written solid-state storage device 11 to a user. Many alternatives exist regarding the transfer assembly 72 as are discussed herein.

With reference to FIG. 2, a preferred embodiment includes a T-rail 22 to the hopper 21 that prevents jamming while loading and ensures proper placement together with the asymmetrical shape of the hopper 21 in the top aspect. Storage devices 11 are provided with complementary structure to the T-rail 22.

Front and rear views of the first preferred dispenser 10 are shown in FIG. 3 and FIG. 4. This particular solution provides for mechanical check valves 31, 32, 33, 34, 35 that assist in moving a device 11 about the dispenser 10 (i.e. via chamber 71 and transfer assembly 72 to retrieval bin 12). As shown, mechanical check valve 31 is fixed to the base 16 while mechanical check valves 32, 33, 34, 35 are fixed to a transfer assembly 72 as further detailed herein. Electrical motor 44 is provided for shaft power to move the transfer assembly 72, however other prime movers could be used in designs contemplated by the present invention. For example, a vacuum apparatus could move a storage device 11 about the dispenser especially practical if the device 11 is small in size such as a secure digital (SD) storage device. Also, magnets could provide motive force configured to the storage devices 11. Power and control is proved to the motor 44 via PCB 13. Line 7-7 provides a cross sectional view of the first preferred dispenser 10.

Figure 6:
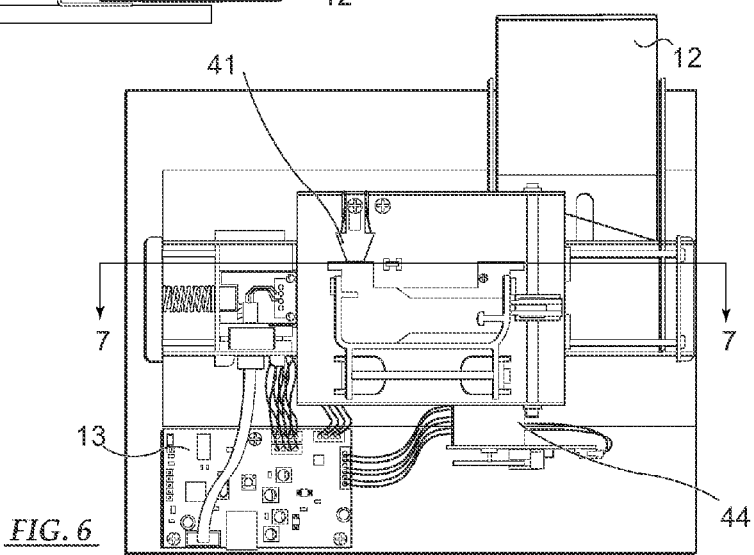
FIG. 6 is a top plan view of the system of the present invention.
Figure 7:
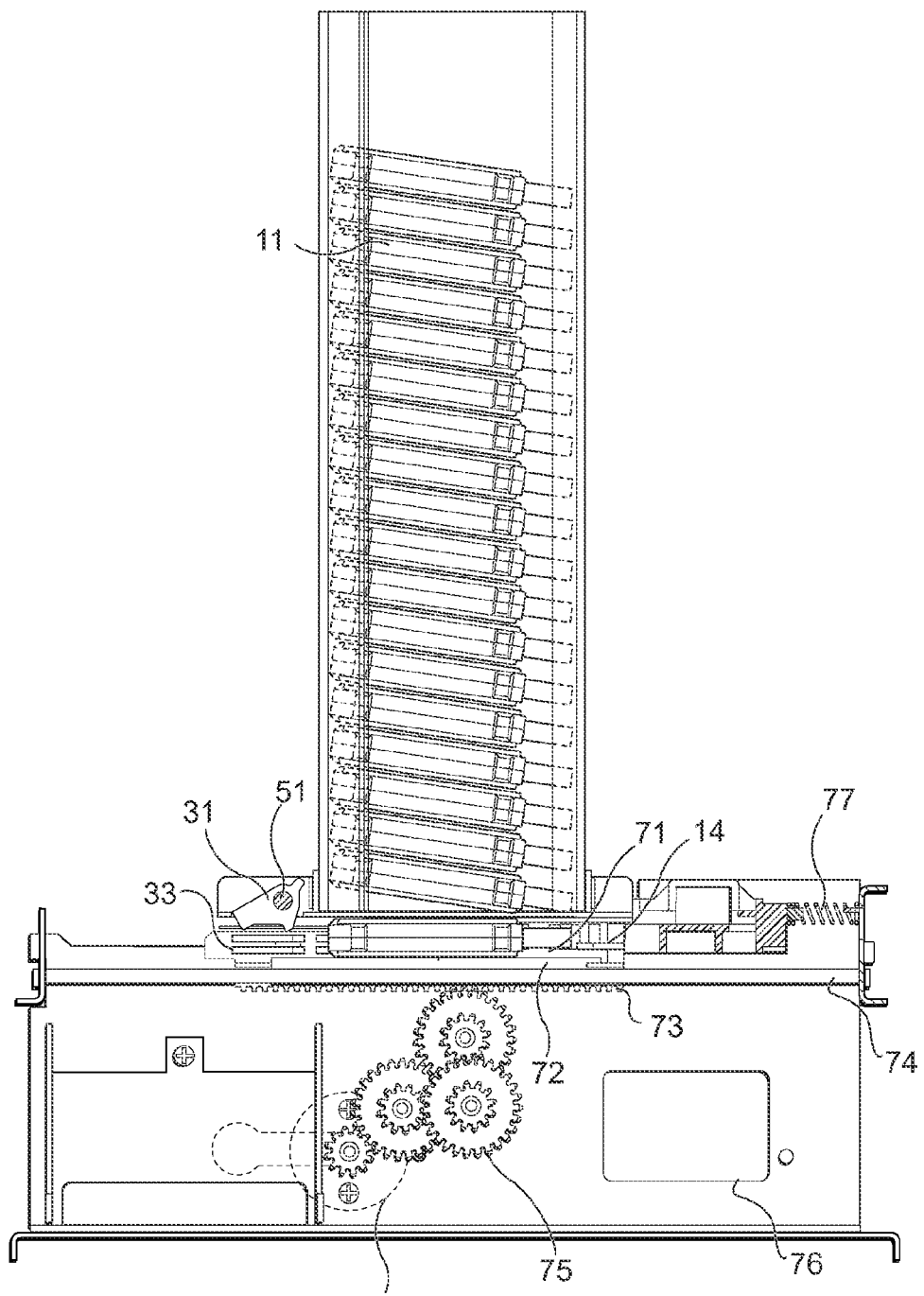
FIG. 7 is a cross sectional view taken along line 7-7 in FIG. 6.

As stated and with regard to FIG. 7, the system 10 includes a transfer assembly 72, on which a device 11 rests for writing and dispensing thereto. When a solid-state storage device 11 moves from the hopper 21 into the chamber 71, it orients the solid-state storage device 11 with the write port 14. As the solid-state storage device 11 is held in the chamber 71, the solid-state storage device 11 may engage with the write port 14 by moving towards and connecting with the write port 14. Alternatively, the write port 14 could be configured to move towards the solid-state storage device 11, engage and subsequently disengage a device. In this particular embodiment, write port 14 is connected to a computer 13 and transfers data from the computer 13. For example, the computer 13 connected to the write port 14 may sense (via sensor 43, FIG. 3 and FIG. 6) the solid-state storage device 11 as it engages with the write port 14 and may automatically start to write data to the solid-state storage device 11. Further, the computer 13 connected to the write port 14 may also send a signal to the system 10 when the computer has finished writing data to the solid-state storage device 11, so that the system 10 knows when it is safe to disengage (i.e. start motor 44) the solid-state storage device 11 from the write port 14. Access opening 76 is further provided for user access to manipulate components for troubleshooting.

In addition to sensor 43, sensor 42 also senses device 11 position. With regard to FIG. 3 and FIG. 7, the sensor 42 on the left detects the end of the assembly 72 travelling leftwards. After which, system 10 tells motor 44 to reverse direction and starts the assembly 72 moving to the right as the key 11 dispenses (as door 33 only opens in one direction it holds the key 11 in place as assembly moves underneath it 11). Next, the right sensor 43 senses a new key 11. The right sensor 43 detects the key 11 is engaged. Alternatively, the unit 10 could detect the two ends by simply jamming against the walls of the dispenser. However, the sensors 42, 43 enable an easy way to detect a jam error state. The computer 13 could also be used to detect key 11 engagement. In that instance, when the computer 13 detects a key 11 is present, a stop command could alternatively be sent to the dispenser 10.

Once the writing of a solid-state storage device 11 has finished, the solid-state storage device 11 may be disengaged from the write port 14. The transfer assembly 72, driven by a motor 44, moves the solid-state storage device 11 from the chamber 72 to the retrieval bin 12 to dispense the solid-state storage device 11. Reduction gears 75 are coupled to motor 44 providing optimum transfer of power and torque to the transfer assembly 72 (also via track 73 on an underside thereof). A worm gear or piston arrangement could also be substituted in place of reduction gears 75. In yet another alternative embodiment, friction between the write port 14 and the solid-state storage device 11 may be used in place of the transfer assembly 72 to move the solid-state storage device 11 to the retrieval bin 12. In other words, once the write port 14 is engaged to the device 11, a friction fit is strong enough to move the device 11 around within the dispenser 10.

Further to the transfer assembly 72, mechanical check valves 32, 33, 34, 35 are configured with grooves that can grasp a side protrusion on a device 11. The mechanical check valves 32, 33, 34, 35 will hold a device 11 while going in one direction (e.g. toward the write port 14) and will release a device 11 when going in a reverse direction if a device 11 is held stationary by the fixed mechanical check valve 31. Meanwhile, the fixed mechanical check valve 31 allows a device 11 to move in one direction preventing movement in the opposite direction. As shown, transfer assembly 72 slides along rails 74. When the solid-state storage device 11 has been moved from the chamber 71 by the transfer assembly 72 or by other means, another solid-state storage device 11 may be transferred from the hopper 21 into the chamber 71 for writing. Thus, the writing and dispensing of the solid-state storage devices 11 may be automated by the system 10.

Sensor 41 (FIG. 4) additionally detects when the dispenser 10 is low or out of USB keys 11. It 41 could be located in multiple places including on the hopper 21 wall, if for example the dispenser 10 was to sense a specific number of keys 11 remaining. Spring 77 is provided for stabilization of the write port 14.

Figure 8:
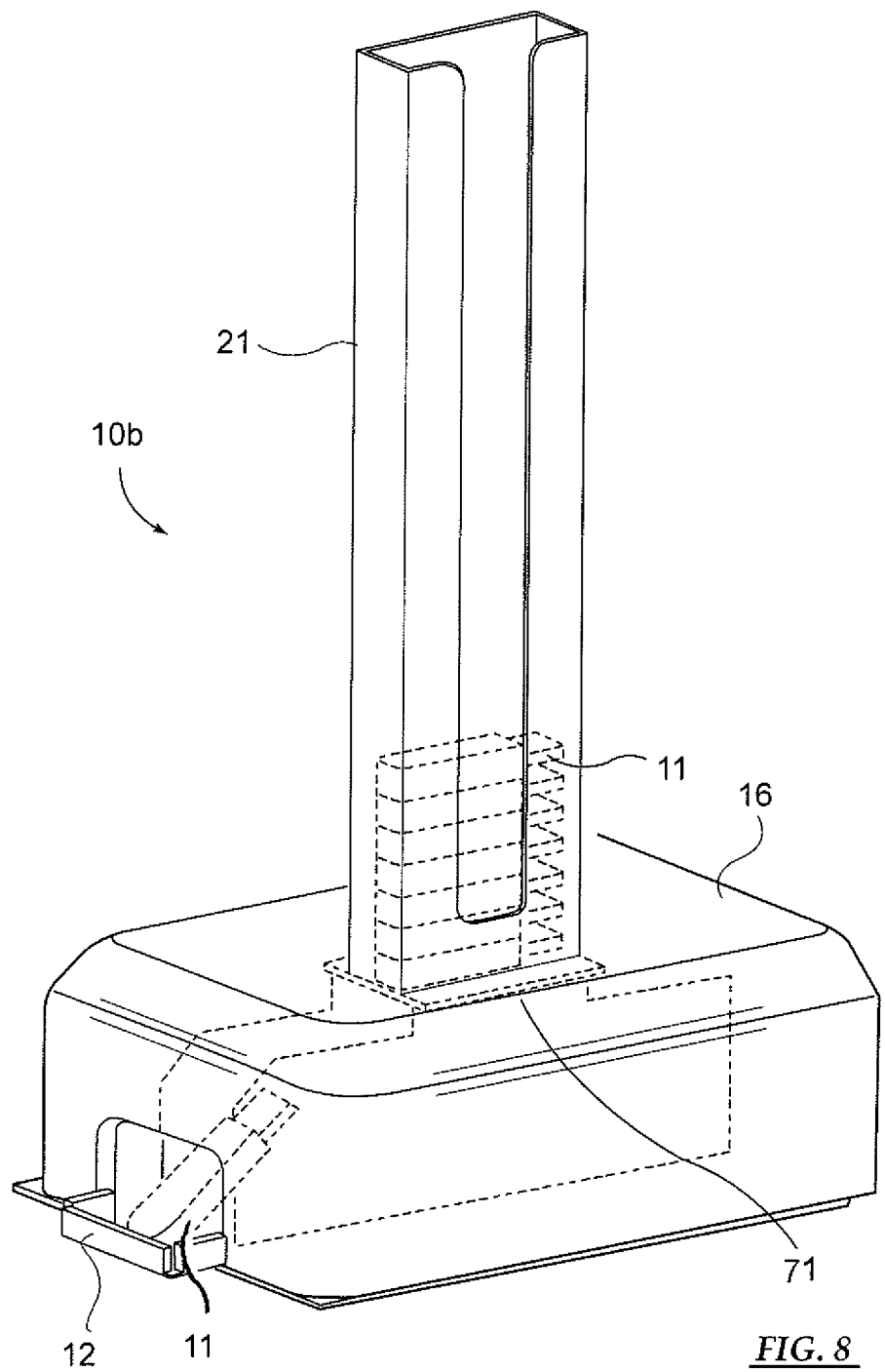
FIG. 8 is a perspective view of an earlier first generation solid state writer and dispenser.
Figure 9:
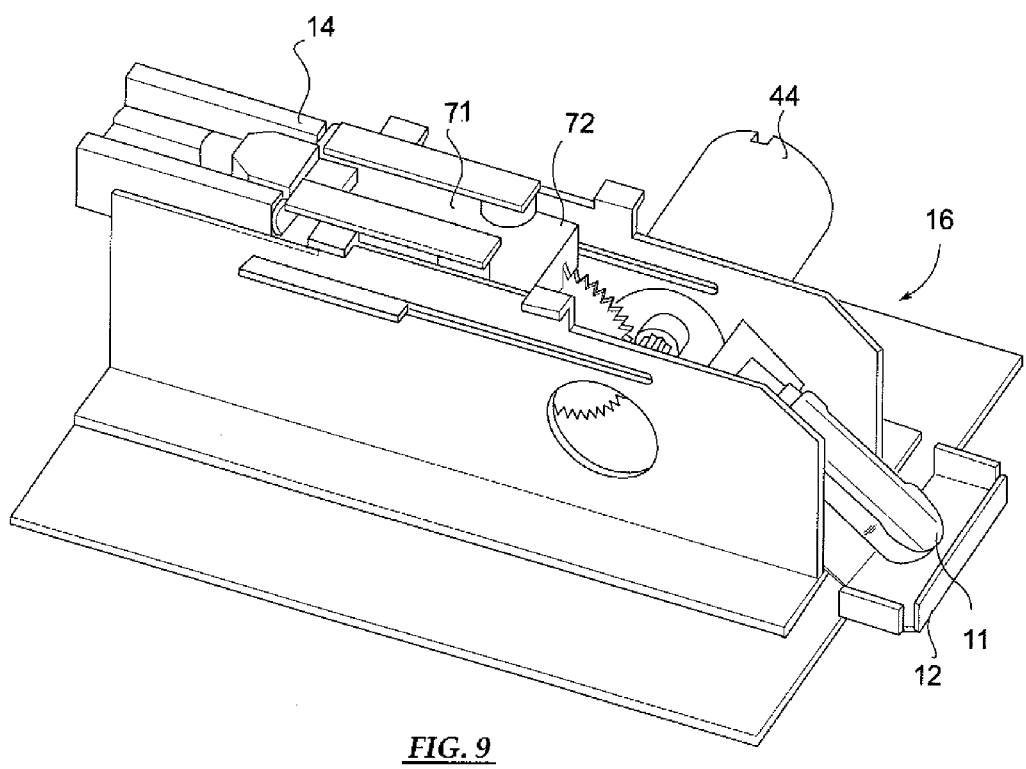
FIG. 9 is an additional perspective view of the first generation device with hopper and housing removed revealing internal components.

With reference to FIG. 8 and FIG. 9, a first generation more simplified device 10b is shown in perspective having lower housing base 16 coupled to a hopper 21 containing solid state storage devices 11. When a solid-state storage device 11 moves from the hopper 21 into the base 16, the solid-state storage device 11 is held by the chamber 71 which may orient the solid-state storage device 11 with a write port 14.

Further with regard to FIG. 9, as the solid-state storage device 11 is held in the chamber 17, the solid-state storage device 11 may engage with the write port 14 by moving towards and connecting with the write port 14. Alternatively, the write port 14 may move towards the solid-state storage device 11. The write port 14 may be connected to a computer and the write port 14 may transfer data from the computer and write that data onto the write port 14. For example, the computer connected to the write port 14 may sense the solid-state storage device 11 as it engages with the write port 14 and may automatically start to write data to the solid-state storage device 14. Further, the computer connected to the write port 14 may also send a signal to the system 10b when the computer has finished writing data to the solid-state storage device 11, so that the system 10b knows when it is safe to disengage the solid-state storage device 11 from the write port 14.

Once the writing of the solid-state storage device 11 has finished, the solid-state storage device 11 may be disengaged from the write port 14. A transfer assembly 72 driven by a motor 44 will then move the solid-state storage device 11 from the chamber 71 to the retrieval bin 12 to dispense the solid-state storage device 11. In alternative embodiments of the present invention, vacuum or friction between the write port 14 and the solid-state storage device 11 may be used in place of the transfer assembly 72 to move the solid-state storage device 11 to the retrieval bin 12.

It should be understood, of course, that the foregoing relates to exemplary embodiments of the invention and that modifications may be made without departing from the spirit and scope of the invention as set forth in the following claims.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular System for Writing and Dispensing Solid State Storage Devices as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. An apparatus for writing data to and dispensing solid-state devices, comprising:
   a first solid state storage device;
   a write port engageable to an interior of the first solid-state storage device to write the electronic data to the solid-state device;
   a transfer assembly for moving the solid-state storage device from engaging the write port to dispense the solid-state storage device
   a first mechanical check valve fixed with respect to a base of the apparatus; and
   a plurality of second and subsequent mechanical check valves coupled to the transfer assembly and not fixed with respect to the base, wherein the second and subsequent mechanical check valves assist in grasping the first solid state storage device, and wherein the first fixed mechanical check valve allows movement of the first solid state storage device in one direction while preventing movement in an opposite direction, thereby allowing the second and subsequent mechanical check valves to release the first solid state storage device to the retrieval bin as the transfer assembly moves back and forth.

2. The apparatus for writing data to and dispensing solid-state devices of claim 1, further comprising:
   second and subsequent solid state storage devices; and
   a hopper configured to a chamber in the same footprint for containing the second and subsequent solid-state storage devices, the hopper further comprising asymmetrical sides in a top aspect.

3. The apparatus for writing data to and dispensing solid-state devices of claim 1, further comprising:
   a motor for driving movement of the transfer assembly; and
   a gear for converting rotational movement to translational movement coupled to the motor and engaging a track at an underside of the transfer assembly.

4. The apparatus for writing data to and dispensing solid-state devices of claim 1 further comprising a printed circuit board coupled to the write port, the printed circuit board further providing command and control functions to the apparatus.

5. The apparatus for writing data to and dispensing solid-state devices of claim 1 further comprising a rail fixed to a base portion positioned lengthwise with respect to the transfer assembly, wherein the transfer assembly is configured to slide along the rail while dispensing the first solid state storage device.

6. The apparatus for writing data to and dispensing solid-state devices of claim 1 further comprising:
   a first sensor detecting movement of the transfer assembly in a first direction;
   a second sensor detecting movement of the transfer assembly in a second direction, the second direction opposite from the first direction; and
   a third sensor for detecting a number of solid state devices that remain in the apparatus.

7. A method for writing data to and dispensing solid-state devices, comprising:
   providing one or more solid state devices;
   containing the one or more solid-state devices within a hopper, the hopper configured directly above a fixed chamber;
   loading a solid state storage device to the chamber via the hopper;
   resting the solid state storing device on a transfer assembly for writing and dispensing thereto;
   moving the solid state storage device in a first direction via the transfer assembly;
   engaging a write port with the solid-state storage device by the moving in the first direction;
   writing the data by the write port to the solid-state device; and
   moving, by the transfer assembly in a second reverse direction, the solid-state storage device from the chamber to a retrieval bin.

8. The method of claim 7, further wherein the moving the solid-state storage device to engage the write port is provided by the transfer assembly via a motor.

9. An apparatus for writing electronic data to and dispensing solid-state devices, comprising:
   a first solid state storage device;
   a write port engageable to an interior of the first solid-state storage device to write the electronic data to the solid-state device;
   a transfer assembly for engaging to the write port and for transferring the first solid state storage device to a retrieval bin;
   a first mechanical check valve fixed with respect to a base of the apparatus; and
   a plurality of second and subsequent mechanical check valves coupled to the transfer assembly and not fixed with respect to the base, wherein the second and subsequent mechanical check valves assist in grasping the first solid state storage device, and wherein the first fixed mechanical check valve allows movement of the first solid state storage device in one direction while preventing movement in an opposite direction, thereby allowing the second and subsequent mechanical check valves to release the first solid state storage device to the retrieval bin as the transfer assembly moves back and forth
   a plurality of second and subsequent solid state storage devices; and
   a hopper configured substantially above the transfer assembly for containing the second and subsequent solid-state storage devices, the hopper further comprising asymmetrical sides in a top aspect.

10. The apparatus for writing electronic data to and dispensing solid-state devices of claim 9, further comprising:
    a motor for driving movement of the transfer assembly; and
    a gear for converting rotational movement to translational movement coupled to the motor and engaging a track at an underside of the transfer assembly.

11. The apparatus for writing data to and dispensing solid-state devices of claim 9 further comprising:
    a printed circuit board coupled to the write port, the further providing command and control functions to the apparatus; and
    a first mechanical check valve fixed with respect to a base of the apparatus;
    a plurality of second and subsequent mechanical check valves coupled to the transfer assembly and not fixed with respect to the base, wherein the second and subsequent mechanical check valves assist in grasping the first solid state storage device, and wherein the first fixed mechanical check valve allows movement of the first solid state storage device in one direction while preventing movement in an opposite direction, thereby allowing the second and subsequent mechanical check valves to release the first solid state storage device to the retrieval bin as the transfer assembly moves back and forth.

12. The apparatus for writing data to and dispensing solid-state devices of claim 9 further comprising a rail fixed to a base portion positioned lengthwise with respect to the transfer assembly, wherein the transfer assembly is configured to slide along the rail while dispensing the first solid state storage device.

13. The apparatus for writing data to and dispensing solid-state devices of claim 9 further comprising:
- a sensor detecting movement of the transfer assembly in a first direction;
- a second sensor detecting movement of the transfer assembly in a second direction, the second direction opposite from the first direction; and
- a third sensor for detecting a number of solid state devices that remain in the apparatus.

\* \* \* \* \*